March 7, 1967 S. FISHER ETAL 3,308,262
ADJUSTING DEVICE FOR WELDING HEAD
Filed May 6, 1964 2 Sheets-Sheet 1
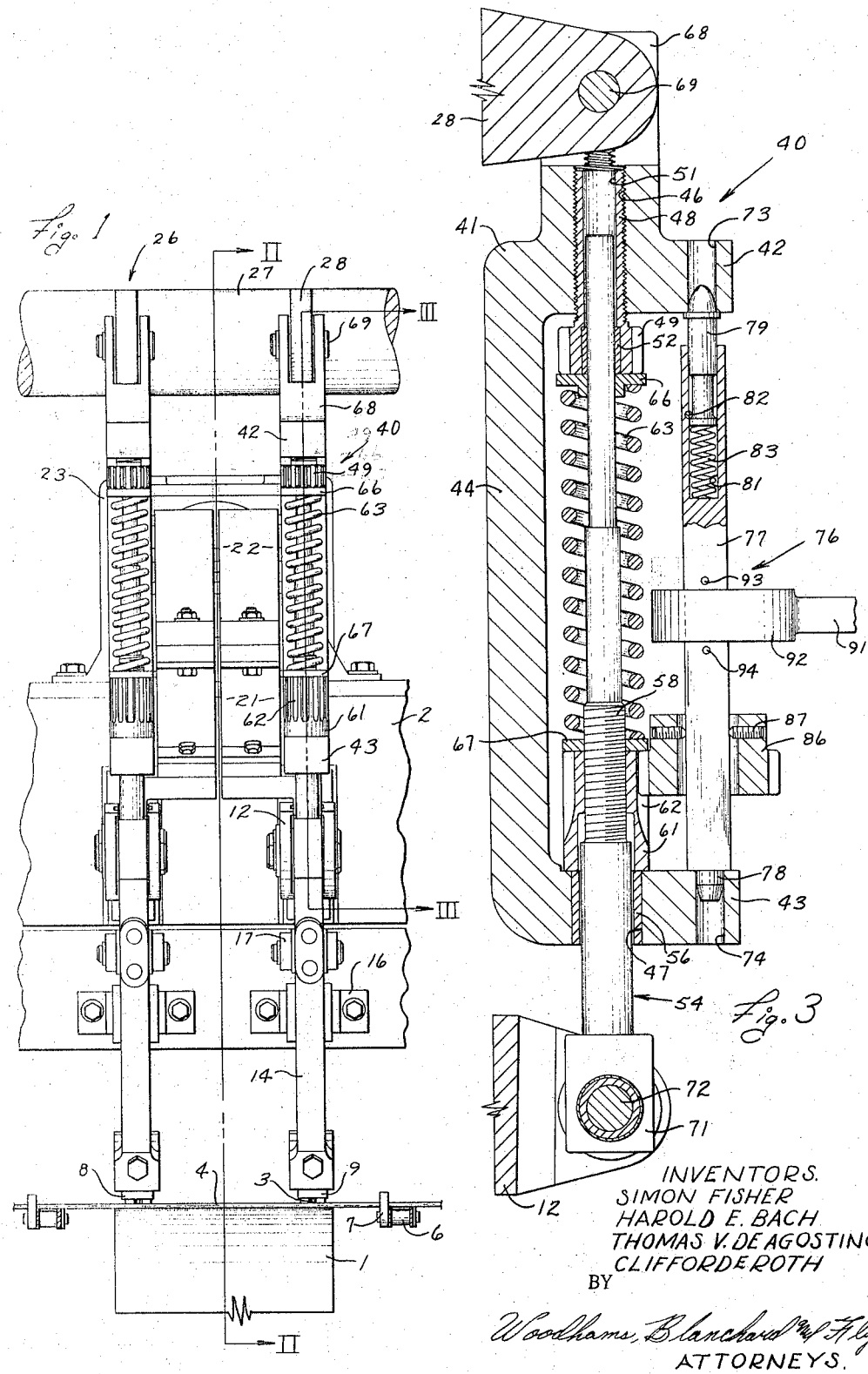
INVENTORS.
SIMON FISHER
HAROLD E. BACH
THOMAS V. DE AGOSTINO
CLIFFORD E. ROTH
BY
Woodhams, Blanchard & Flynn
ATTORNEYS.

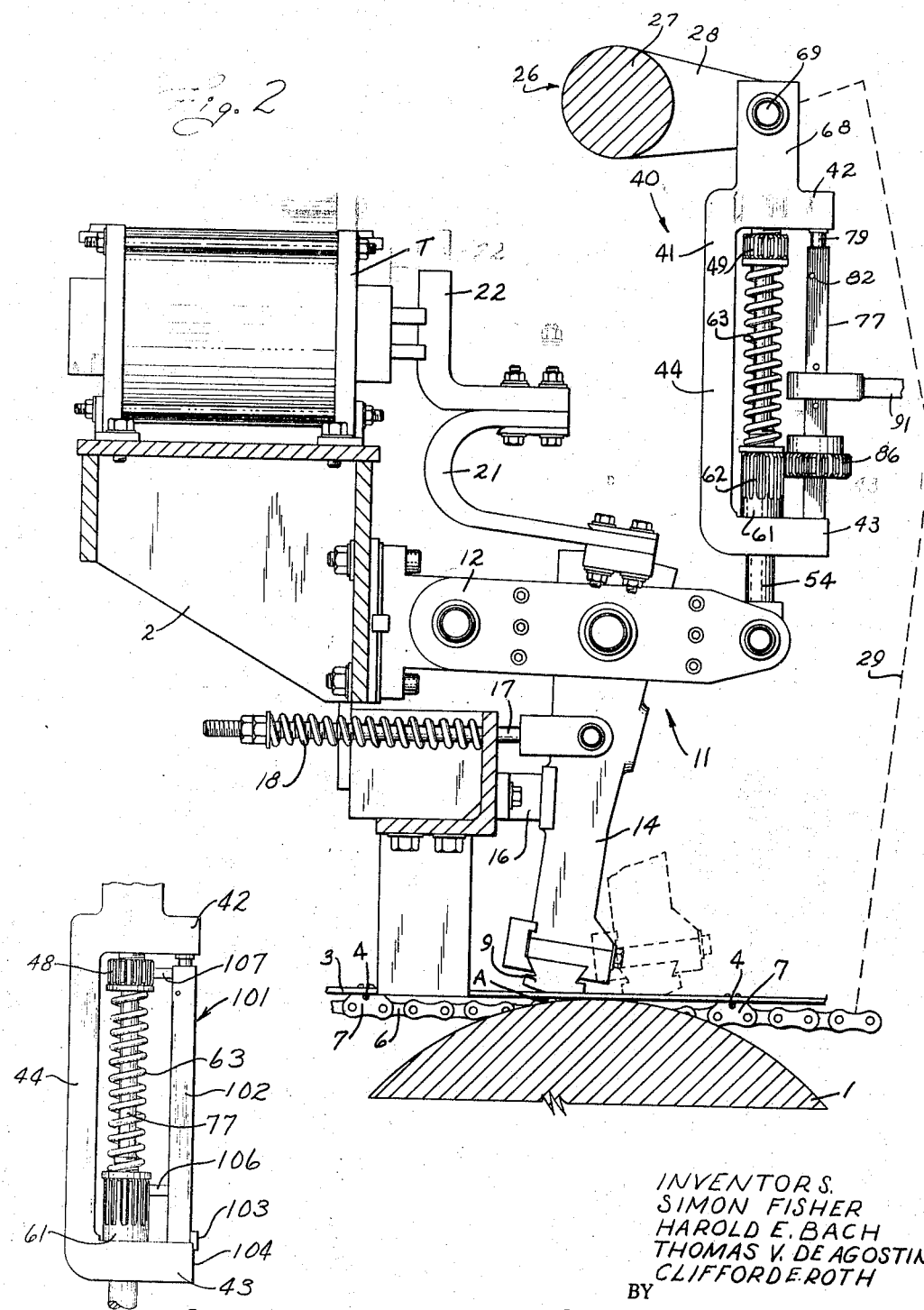

United States Patent Office 3,308,262
Patented Mar. 7, 1967

3,308,262
ADJUSTING DEVICE FOR WELDING HEAD
Simon Fisher, Bay City, Harold E. Bach, Monitor Township, Bay County, and Thomas V. De Agostino and Clifford E. Roth, Bay City, Mich., assignors to National Electric Welding Machines Co., Bay City, Mich., a corporation of Michigan
Filed May 6, 1964, Ser. No. 365,373
10 Claims. (Cl. 219—78)

This invention relates to a resistance welding machine and particularly to means controlling the positioning of an electrode in such a machine.

While the need out of which the present invention arose originated in connection with machines for welding reinforcing mats, namely, wire or rod sections arranged in a grid pattern and welded together at their points of intersection, and the hereinafter following description refers to such apparatus for convenience in effecting a disclosure of the invention, it will be recognized that the subject matter of the invention is applicable to many types of welding electrodes requiring convenient adjustment of both their position with respect to a workpiece and a spring tension urging same against said workpiece. Accordingly, the specific reference herein to a mat welding machine will be recognized for illustrative purposes only and the broader applicability of the invention will be understood.

In presently known welding machines, wherein an electrode is urged by mechanical spring pressure against a workpiece and wherein said electrode is adjusted vertically to accommodate itself to workpieces of varying thickness, it has been previously known to provide any of a wide variety of devices for this purpose and many such devices are known to prior designers in this field. However, insofar as I am aware, these devices have been relatively complicated and therefore expensive to manufacture and to maintain ineffective operating condition. These devices have also been relatively time consuming with regard to effecting the desired adjustments thereon. Particularly, the electrode-to-workpiece position adjustment has usually been provided by one piece of equipment and the spring pressure adjusting apparatus has been provided by another piece of equipment. These two pieces of equipment have often been somewhat separated from each other and therefore required the attention of the workman at two different portions of the machine often somewhat spaced from each other.

Accordingly, the objects of the invention include:

(1) To provide position and tension adjusting means for a welding electrode which can be conveniently manipulated by a workman from a single station.

(2) To provide adjusting means, as aforesaid, which will be more convenient to operate than previously known equipment and by which therefore an electrode adjusting operation may be carried out more quickly than by previously known means.

(3) To provide adjusting means, as aforesaid, which will be particularly applicable to a resistance welding electrode and which will be simple and therefore economical to construct and equally economical to maintain in good operating condition.

(4) To provide adjusting mechanism, as aforesaid, which will be compatible with a welding electrode of the simultaneously swinging and reciprocating type but which will nevertheless meet the objectives aforesaid.

(5) To provide apparatus, as aforesaid, wherein a gang of such electrodes may be individually adjusted as required to meet given operating conditions and wherein the adjustment of each electrode will be completely independent and unaffected by the adjustment of other electrodes.

(6) To provide apparatus, as aforesaid, in which said electrodes may be adjusted within extremely fine limits but wherein when said electrodes are adjusted in a given desired manner, they will remain so adjusted through all conditions of ordinary use.

Other objects and purposes of the invention will be apparent to persons acquainted with apparatus of this general type upon reading the following disclosure and inspection of the accompanying drawings.

In the drawings:

FIGURE 1 is a fragmentary elevational view of a pair of electrodes taken from a gang of generally similar electrodes used on a mat resistance welding machine and with the manually manipulated portion thereof removed for increased clarity.

FIGURE 2 is a partially broken fragmentary section essentially as taken on the line II—II of FIGURE 1 and including the manually manipulated portion.

FIGURE 3 is an enlarged fragmentary section essentially as taken on the line III—III of FIGURE 1 and including the manually manipulated portion.

FIGURE 4 shows a fragment of FIGURE 2 with an auxiliary fitting in place.

Certain terminology will be used in the following description for convenience in reference only and is not limiting. The words "upwardly," "downwardly," "rightwardly" and "leftwardly" will indicate directions in the drawings to which reference is made. The words "inwardly" and "outwardly" will refer to directions toward and away from, respectively, the geometric center of the apparatus.

General description

In general, the invention consists of a frame affixed to a suitable electrode reciprocating and swinging mechanism of any desired type with the electrode holding means comprising an elongated rod mounted within said frame for reciprocable sliding in an electrode position adjusting direction. Resilient means are provided for acting between said frame and said rod for urging said rod in one direction with pressure adjusting means preferably sleeved on said rod for adjusting the force on said resilient means. Position adjusting means, such as threaded means, are also provided between said frame and said rod for determining the limit to which said resilient means can urge said rod and accordingly the limit to which said resilient means can urge said electrode.

Detailed description

In the particular machine selected to illustrate the invention, there is provided a drum 1 (FIGURES 1 and 2) rotatably mounted by any convenient means, not shown, with respect to structure including a base 2 to act as an anvil against which workpieces are positioned for welding. Said workpieces here include a plurality of longitudinal wires 3 which are laid in any desired manner across said drum 1 and suitable cross wires 4 for welding to said longitudinals 3 which are held in properly spaced position with respect to each other and in contact with said longitudinals 3 by an appropriate conveyor 6. In this embodiment, said conveyor 6 consists of a plurality of chains carrying suitable lugs 7 for receiving and guiding said cross wires 4. Said conveyors are driven at a speed equal to that of said longitudinal wires 3 in a manner already well known and by means already well understood.

A plurality of electrodes, two of which are shown at 8 and 9 are provided for engaging the longitudinals 3 and urging same tightly against said cross wires 4 which are in turn urged against the drum 1. Electric current is caused to flow from a suitable transformer T through a circuit including the electrodes, work pieces and drum in a conventional manner. One particular circuit utilized in the commercial embodiment of the invention includes two electrodes acting in co-operation with a single drum 1 wherein the current flow is from the transformer secondary through one electrode, such as electrode 9, through the intersection A of the workpieces to the drum 1 and then back through the corresponding intersection of workpieces below electrode 8 to the electrode 8 to return to said secondary winding. The electrodes 8 and 9 are normally held by means hereinafter further described in the position shown in FIGURE 2. Said electrodes are moved downwardly by said means against the workpieces and are moved in a downstream direction (rightwardly as appearing in FIGURE 2) by the rotation of the drum 1 and the corresponding and simultaneous advancement of the workpieces to the position indicated in broken lines in FIGURE 2 and are then retracted. A conventional welding operation may be carried out through the normal four steps of squeeze, weld, hold and off while said electrodes are advancing with the workpieces and the supporting drum 1 from the solid line position of FIGURE 2 to the broken line position thereof.

The means supporting and driving the electrodes 8 and 9 are preferably identical and hence only said means associated with one of said electrodes, here the electrode 9, need be described. Holder means generally indicated at 11 and associated with the electrode 9 include, briefly, a carrying lever 12 pivotally supported at one end thereof with respect to the base 2. A depending hanger 14 is pivotally supported intermediate the ends of the carrying lever 12 and carries the electrode 9 on its lower end. An abutment 16 is fixed with respect to the base 2 below the carrying lever 12 and limits upstream (leftward as seen in FIGURE 2) motion of the bottom of the hanger 14. A clevis rod 17 engages the hanger 14 between the carrying lever 12 and abutment 16 and carries a spring 18 urging the hanger 14 toward and into normal contact with the abutment 16. Suitable conductors 21 and 22, conductor 21 being preferably flexible, convey electric current to the hanger 14 from any convenient source such as a welding transformer T. Movement initiating means 26 may be of any convenient type and here comprise a shaft 27 with a lever arm 28 fixed thereto. Said movement initiating means 26 is preferably mechanically synchronized, as indicated by the broken line 29, with the movement of the conveyor 6. The above-described holder means 11 and movement initiating means 26 exemplify a possible environment for the device embodying the invention and described hereinbelow. However, it will be understood that the device embodying the invention will function satisfactorily in working environments other than the one above disclosed and hence is not limited thereto.

The adjusting device 40 embodying the invention normally connects between means holding the electrode 9, here the holder means 11, and means which impart a motion to said electrode 9, here the movement initiating means 26.

The particular adjusting device 40 comprising the embodiment of the invention chosen to illustrate said invention and its method of operation will now be considered in detail.

The device 40 includes an upstanding, generally C-shaped, frame 41 (FIGURE 3) comprising spaced, preferably parallel, upper and lower arms 42 and 43, respectively. The arms 42 and 43 have coaxial openings 46 and 47, respectively, therethrough, adjacent to but spaced from the bight portion 44 of said frame 41. An elongated pressure adjusting sleeve 48 is externally threaded in its upper portion for threaded engagement in the opening 46 and has a radially enlarged lower end 49 which is advantageously shaped as a spur gear. The pressure adjusting sleeve 48 has a preferably cylindrical central opening 51 extending axially therethrough which may be bushed, if desired, as indicated at 52.

A reciprocable element such as the extended rod 54 is slidably receivable upwardly through the lower opening 47, which may be bushed as indicated at 56, and through the bushing 52 and into the central opening 51 of the pressure adjusting sleeve 48. Bushings 52 and 56 restrain said rod 54 from radial motion. The rod 54 includes a threaded portion normally located between the arm 42 and adjacent the arm 43. A position adjusting sleeve 61 is internally threaded to engage the threads 58 of the rod 54 above the arm 43 whereby to provide an adjustable limit to the downward movement of the rod 54 with respect to the frame 41. The position adjusting sleeve 61 is provided with external gear teeth 62 for purposes appearing hereinafter. The toothed portions of the sleeves 48 and 61 are identical in cross section for purposes appearing hereinafter.

An elongated spiral spring 63 axially surrounds the rod 54 and is compressibly held by suitable washers 66 and 67 between the opposed faces of the respective sleeves 48 and 61. Thus, the spring 63 normally urges the rod 54 downwardly whereby the position adjusting sleeve 61 normally contacts and is supported by the arm 43 to prevent further downward movement of the rod 54.

The adjusting device 40 (FIGURE 2) is normally secured to and located between movement initiating means, such as the means 26, and electrode holder means, such as the means 11. In the particular embodiment shown, the C-shaped frame 41 has an upwardly extending and generally U-shaped extension 68 which is joined by a pivot pin 69 to the free end of the lever arm 28 of the movement initiating means 26. Also in the particular embodiment shown, the rod 54 has its lower end terminated in an enlarged portion 71 (FIGURE 3) which is pivotally affixed by means of a pivot pin 72 to the remaining (here rightward) end of the carrying lever 12 of the holder means 11. Thus, a downward movement of the frame 41 (FIGURE 2) urges the rod 54 correspondingly downwardly through the spring 63. The rod 54 thus resiliently urged tends to move, in the particular embodiment shown, the electrode 9 firmly into contact with the workpieces supported on and passing over the drum 1.

The arms 42 and 43 (FIGURE 3) have a pair of coaxial holes 73 and 74, respectively, passing therethrough near the outer ends thereof, the axis of said holes being parallel to that through the openings 46 and 47 and spaced therefrom. A setting tool generally indicated at 76, is removably and notably insertable in and between the holes 73 and 74 for rotatably adjusting both the pressure adjusting sleeve 48 and the position adjusting sleeve 61 with respect to the elements threadably engaged thereby. The setting tool 76 includes an elongated, upstanding shaft 77 which is preferably of square cross section and is somewhat shorter than the distance between the arms 42 and 43. The shaft 77 has a circular, chamfered extension 78 at one end thereof engageable with either one of the holes 73 or 74 and has an axially adjustable extension 79 on the other end thereof which is capable of entering the other one of the holes 73 or 74. The extension 79 is snugly but slidably entrained in an axially opening recess 81 in said other end of the shaft 77 and is limited in its axially outward movement therealong by suitable stop means 82, here comprising a pin affixed to the shaft 77. The extension 79 is urged axially outwardly by resilient means such as the spring 83. It will be apparent that the shaft 77 may occupy its position shown in FIGURES 2 and 3 where the adjustable extension 79 is rotatably engaged by the hole 73 and wherein the extension 78 is engaged in the hole 74 or that the shaft 77 may be reversed so that the holes 73 and 74 rotatably support the opposite extensions 78 and 79, respectively. The shaft 77 supports a drive gear 86 for rotation therewith. Suitable means, such as set screws one of which is indicated at 87, are used to maintain the gear 86 against rotation with respect to the shaft 77. Said gear here has a circular central opening receiving the shaft 77 for simplified machining but may if desired be bored to the same cross section as the shaft 77. The set screws 87 are also usable to adjustably maintain the axial position of the gear 86 on the shaft 77. The drive gear 86 is preferably larger than the gears defined by the sleeves 48 and 61 so that the shaft need be rotated only once to effect more than one revolution of that one of said sleeves engaged by said drive gear 86. A manually actuatable handle 91 of any convenient type includes a head 92 engaging the shaft 77 intermediate the ends thereof for causing rotation of said shaft 77 upon pivotal movement of the handle 91 about the axis thereof. The head 92 is preferably a ratchet head such that the shaft 77 may be continuously rotated by repeated movement of the handle through a semicircular arc. Suitable pins 93 and 94 extending radially out of the shaft 77 closely limit axial movement of the handle 91 along the shaft 77.

*Operation*

The operation of the movement initiating means 26 and holder means 11 with respect to passage of the wires 3 and 4 across the drum 1 has been indicated hereinabove and consequently only a brief summary of said operation will now be given.

The movement initiating means 26 (FIGURE 2) is preferably operated in synchronism with the passage of the cross wires 4 along the drum 1 so that the lever arm 28 will be moved upwardly and downwardly in a predetermined cyclical manner upon the appearance of cross wires 4 adjacent the welding head 9. Said motion of the lever arm 28 is transmitted through the adjusting device 40 embodying the invention to the holder means 11 carrying the electrode 9. As a result of the transmittal of such motion and of the pivotal support of the carrying lever 12, hanger 14 and of the resilient urging of the clevis rod 17, the electrode 9 will be moved downwardly into contact with the longitudinal 3 and the cross wire 4 and will press same firmly against each other and against the drum 1, whereby rotation of the drum 1 and traveling of the longitudinal 3 downstream will cause the electrode 9 to travel with the circumference of the drum 1 and weld the longitudinal 3 to the cross wire 4. After such welding has been effected in a conventional manner, the means 26 effects, through the adjusting device 40, an upward movement of the holder means 11 thereby freeing the electrode 9 from the wires 3 and 4 and drum 1 so that the urging of the spring 18 may return said electrode 9 to the starting position shown in FIGURE 2.

The operation of the adjusting device 40 has been indicated somewhat above but will be given hereinbelow in detail to assure a more complete understanding of the invention. A downward urging of the C-shaped frame 41 by the extension 68 and pivot pin 69 is transmitted by the pressure adjusting sleeve 48 to the spring 63 and thence to the position adjusting sleeve 61. The sleeve 61 normally is urged into contact by the compression force on the spring 63 as shown in the drawings and will remain in such position under normal circumstances. Connection of the position adjusting sleeve 61 to the rod 54 transmits downward motion of the frame 41 to said rod which in turn moves means connected therewith such as the carrying lever 12 downwardly to effect downward movement of the electrode 9. If downward motion of the rod 54 is retarded by a force of sufficient magnitude during continued downward motion of the frame 41, the position adjusting sleeve 61 will rise off the arm 43 thus further compressing the spring 63 till the downward force of the spring 63 on the rod 54 is equal to the upward force of the rod 54 exerted by the carrying lever 12. Compressional force upon the spring 63 may be readily adjusted by threading the pressure adjusting sleeve 48 axially within the opening 46. Thus, the force of contact between the electrode 9, the wires 3 and 4 and the drum 1 will be a resilient one and will be adjustable by the operator as required by the welding operation. The distance above the drum 1 at which the electrode 9 is located when the mechanism is in its idle condition is determined by the axial placement of the position adjusting sleeve 61 on the rod 54. Such placement is effected by a rotation of said sleeve 61 on the threaded portion 58 of said rod 54. In this manner, the point in the cycle of the movement initiating means 26 at which the electrode 9 contacts the wires 3 and 4 may be adjusted as desired.

The setting tool 76 is furnished to enable adjustment of the pressure adjusting sleeve 48 and the position adjusting sleeve 61. One such tool may serve several adjusting devices 40. The setting tool 76 may be installed in its operative position simply by inserting the extension 79 into one of the holes 73 and 74, moving the shaft 77 axially toward the extension 79 thereby compressing the spring 83, simultaneously moving the extension 78 into alignment with the other of the holes 73 and 74 and then allowing the force of the spring 83 to insert the extension 78 into the hole adjacent thereto. In this way, shaft 77 lies coaxial of the common central axis of the holes 73 and 74 is normally engaged against axial movement with respect thereto but is rotatable with respect thereto. Removal of the tool 76 is effected by reversal of the above steps. When the extension 78 is in the hole 74, the drive gear 86 engages the gear teeth 62 on the position adjusting sleeve 61 whereby pivotal movement of the handle 91 will effect rotation and consequent adjustment of the position adjusting sleeve 61. Installation of the setting tool 76 in the opposite manner so that the extension 78 engages the hole 73 and with an axial adjustment of the position of the drive gear 86 on the shaft 77 allowed by the set screws 87 whereby the drive gear 86 may engage the teeth 49 of the pressure adjusting sleeve 48 and allow the pivotal movement of the handle 91 to adjust the pressure adjusting sleeve 48.

If in some instances of high-speed operation the vibration of the machine tends to work the mechanism 40 out of adjustment, said mechanism may be easily locked in place by a locking unit 101 (FIGURE 4). The shank 102 may be identical with the shank 77 and insertable into the same openings 73 and 74 in place of the setting tool 76. Said shank 102 is provided with any convenient device to prevent rotation thereof, such as an angle 103 embracing a flat surface 104, and has pins or teeth 106 and 107 engaging the gear teeth on the adjusting sleeves 48 and 61.

Although a particular preferred embodiment of the invention has been disclosed above for illustrative purposes, it will be recognized that variations or modifications of such disclosure, which lie within the scope of the appended claims, are fully contemplated.

What is claimed is:

1. In a device for holding a welding electrode in position for engagement with a workpiece, said device independently adjusting both the position of said electrode with respect to said workpiece and the resilient pressure by which said electrode is caused to bear against said workpiece, the combination comprising:

a frame and means operatively associated therewith for positioning said electrode with respect to a workpiece, said frame including a pair of similarly oriented guideways;

a reciprocable element slidably received within said guideways and having a projecting portion extending beyond said frame at one side thereof, the position of said electrode being controlled by such projecting portion of said element;

adjustment position means adjustably coupled with said reciprocable element for limiting travel of said reciprocable element with respect to said frame in a direction with respect to the workpiece to be engaged by said electrode, said adjustment position means having a movable element concentric with said reciprocable element and rotatable relative thereto to cause the limited travel of said reciprocable element to be adjusted, and resilient means operatively arranged between said adjustment position means and said frame for resiliently urging said reciprocable element in said direction to a limit permitted by said adjustment position means.

2. The device defined in claim 1 wherein said guideways are coaxial and said reciprocable element is a single rectilinear element.

3. The device defined in claim 1 wherein said adjustment position means for said reciprocable element includes a pair of interengaging threaded means, said movable element being a threaded sleeve member concentrically mounted on said reciprocable element and comprising one of said threaded means, adjustment of the limit of movement of said reciprocable element being made by rotation of said threaded sleeve member.

4. The device defined in claim 1 wherein said adjustment position means for said reciprocable element includes a pair of interengaging threaded means, one of said threaded means being said movable element, with adjustment of the limit of movement of said reciprocable element being made by rotation of one of said threaded means;
a first gear on one of said threaded means;
a second gear rotatably arranged with respect to, and in mesh with, said first gear, and manually operable means for rotating said second gear, whereby adjustment of the said threaded means is effected.

5. In a device for holding a welding electrode in position for engagement with a workpiece, said device adjusting both the position of said electrode with respect to said workpiece and the resilient pressure by which said electrode is caused to bear against said workpiece, the combination comprising:
a frame and means operatively associated therewith for positioning said electrode with respect to said workpiece, said frame including a pair of similarly oriented guideways;
a reciprocable element slidably received within said guideways for supporting said electrode;
pressure adjusting means for adjusting the resilient pressure of the electrode on the workpiece without affecting the position of the electrode relative to the workpiece;
resilient means operatively arranged between said reciprocable element and said pressure adjusting means for resiliently urging said reciprocable element toward the workpiece;
said pressure adjusting means including a pair of interengaging threaded means with adjustment of the limit of movement of said reciprocable element being made by rotation of one of said threaded means;
a first gear on one of said threaded means;
a second gear rotatably arranged with respect to, and in mesh with, said first gear, and manually operable means for rotating said second gear, whereby rapid adjustment of the said threaded means is effected.

6. In a device for holding a welding electrode in position for engagement with a workpiece, said device adjusting both the position of said electrode with respect to said workpiece and the resilient pressure by which said electrode is caused to bear against said workpiece, the combination comprising:
a generally C-shaped frame comprising first and second spaced, parallel arms connected at one end thereof by an integral bight portion;
first and second coaxial openings through said first and second arms, respectively, and intermediate the ends thereof;
a pressure adjusting sleeve threadedly engaged within said first opening for axial adjustment with respect thereto, said pressure adjusting sleeve including a gear toothed head located between said arms;
an elongated rod rotatably and axially slidably held within and extending between said second opening and said pressure adjusting sleeve, said rod having an end located outwardly of said second arm for connection to said electrode;
a position adjusting sleeve threadedly engaging said rod therewithin, located between said arms and having a gear toothed outer surface identical in cross section to that of said pressure adjusting sleeve;
a spiral compression spring coaxially surrounding said rod between said pressure adjusting sleeve and said position adjusting sleeve for resiliently urging said position adjusting sleeve away from said pressure adjusting sleeve so that said position adjusting sleeve normally bears on said second arm;
a pair of coaxial holes in said arms adjacent the ends thereof opposite said bight portion;
a shaft having a coaxial fixed stub at one end thereof for alternate insertion into and rotation within either one of said holes and having an axially outwardly resiliently urged and coaxial movable stub at the other end thereof for alternate insertion into and rotation within the remaining one of said holes;
an externally toothed gear fixed for rotation with said shaft but axially adjustable therealong, said gear drivingly engageable with the gear teeth of one of said sleeves when said fixed stub is in one of said holes and engaging the gear teeth of the other of said sleeves when said fixed stub is in the other of said holes;
a ratchet handle drivingly engaging said shaft for rotating same to effect adjustment of a selected one of said adjusting sleeves.

7. The device defined in claim 1 wherein said position adjusting means for said reciprocable element includes a pair of interengaging threaded means with adjustment of the limit of movement of said reciprocable element being made by rotation of one of said threaded means, said movable element comprising one of said threaded means;
a first toothed element on one of said threaded means;
a second toothed element and means removably and nonrotatably holding said second toothed element in mesh with said first toothed element for locking said position adjusting means in a selected position.

8. In a device for holding a welding electrode in position for engagement with a workpiece, said device adjusting both the position of said electrode with respect to said workpiece and the resilient pressure by which said electrode is caused to bear against said workpiece, the combination comprising:
a frame and means operatively associated therewith for positioning said electrode with respect to a workpiece, said frame being generally a C-shaped element and including a pair of coaxial guideways arranged in the arms of said C-shaped element;
a reciprocable element slideably received within said guideways and having a projecting portion extending beyond said frame at one side thereof, the position of said electrode being controlled by said projecting portion of said element;
position adjusting means limiting travel of said reciprocable element with respect to said frame in a direction with respect to the workpiece to be engaged by said electrode, said position adjusting means being located between said reciprocable member and one arm of said C-shaped element and including a pair of threaded members rotatable with respect to each other for effecting said adjustment, one of said threaded members having manually actuatable means operably related thereto;
resilient means operatively arranged between said reciprocable element and said frame for resiliently urging said reciprocable element in said direction to a limit permitted by said position adjustment means; and manually actuable pressure adjusting means for adjusting the resilient pressure of the electrodes against the workpiece, said pressure adjusting means being arranged adjacent the other arm of said C-shaped element and including a pair of interthreaded members rotatable with respect to each other, said members being arranged between said resilient means and said frame.

9. In a welding machine for holding a welding electrode in position for engagement with a workpiece, said machine permitting adjustment of both the position of said electrode with respect to said workpiece and the resilient pressure by which said electrode is caused to bear against the workpiece, the combination comprising:

a base, a carrying lever pivotally supported from said base, an electrode hanger operatively coupled to said carrying lever at a point spaced from said pivot, a transformer, and means operatively coupling said transformer with said electrode hanger; and means resiliently biasing said electrode hanger in a direction tending to move the electrode along the face of the workpiece;

a movable frame means, said frame means including a pair of similarly oriented guideways;

a reciprocable element slideably received within said guideways and having a projecting portion extending beyond said frame at one side thereof, the projecting portion being operatively connected with said carrying lever;

position adjusting means limiting travel of said reciprocable element with respect to said frame means in a direction with respect to the workpiece to be engaged by said electrode, a resilient means operatively arranged between said reciprocable element and said frame means for resiliently urging said reciprocable element in said direction to a limit permitted by said position adjusting means; and drive means operatively connected to said frame means for moving said frame means and its associated reciprocable element whereby motion can be imposed upon said carrying lever, thereby positioning said electrode with respect to the workpiece.

10. In a device for holding a welding electrode in position for engagement with a workpiece and capable of independently adjusting both the position of said electrode with respect to said workpiece and the resilient pressure with which the electrode is caused to bear on the workpiece, the combination comprising:

a frame and means operatively associated therewith for positioning said electrode with respect to said workpiece;

a reciprocable element slideably supported on said frame and means connecting said element to said electrode for moving said electrode into and out of contact with said workpiece on reciprocation of said element;

spaced first and second means axially aligned with said element, said first means being threadedly adjustable on said element and engageable with said frame for limiting travel of said element in at least one direction independently of adjustment of said second means and said second means being threadedly adjustably mounted with respect to said frame; and resilient means disposed between said first and second means for urging said element in said one direction to the limit established by said first means, adjustment of said second means changing the ribboning force of the spring independently of any adjustment of said first means.

References Cited by the Examiner
UNITED STATES PATENTS

| | | | |
|---|---|---|---|
| 1,536,838 | 5/1925 | Geisenhoner | 219—86 |
| 2,684,421 | 7/1954 | Hipple | 219—79 |
| 2,951,932 | 9/1960 | Heckman et al. | 219—78 |
| 3,045,103 | 7/1962 | Warner | 219—78 |

RICHARD M. WOOD, *Primary Examiner.*

B. A. STEIN, *Assistant Examiner.*